(12) United States Patent
Bray et al.

(10) Patent No.: US 8,800,011 B2
(45) Date of Patent: Aug. 5, 2014

(54) VALIDATING POINTER RECORDS IN A DOMAIN NAME SYSTEM (DNS) SERVICE

(75) Inventors: Keith Bray, Austin, TX (US); Daniel Morris, Austin, TX (US); Randall Burt, Round Rock, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

(21) Appl. No.: 13/484,469

(22) Filed: May 31, 2012

(65) Prior Publication Data

US 2013/0326599 A1    Dec. 5, 2013

(51) Int. Cl.
*G06F 21/31* (2013.01)

(52) U.S. Cl.
USPC ........ 726/6; 726/7; 726/1; 709/223; 709/245; 713/176

(58) Field of Classification Search
CPC .. H04L 63/0236; H04L 63/1466; G06F 21/78
USPC ................ 709/201–203, 217–226; 726/2–10; 713/176, 173, 183
See application file for complete search history.

(56) References Cited

U.S. PATENT DOCUMENTS

| | | | |
|---|---|---|---|
| 7,774,857 B2 * | 8/2010 | Crance | 726/33 |
| 8,302,196 B2 * | 10/2012 | Soderberg et al. | 726/25 |
| 8,521,904 B1 * | 8/2013 | Pei et al. | 709/238 |
| 8,645,700 B2 * | 2/2014 | Smith et al. | 713/176 |
| 2005/0267978 A1 | 12/2005 | Satapati | |
| 2009/0276828 A1 * | 11/2009 | Swander et al. | 726/1 |
| 2010/0100957 A1 | 4/2010 | Graham et al. | |
| 2010/0174829 A1 * | 7/2010 | Drako | 709/245 |
| 2012/0131156 A1 * | 5/2012 | Brandt et al. | 709/221 |
| 2012/0278626 A1 * | 11/2012 | Smith et al. | 713/176 |
| 2012/0278872 A1 * | 11/2012 | Woelfel et al. | 726/7 |
| 2013/0204997 A1 * | 8/2013 | Eggleston et al. | 709/223 |
| 2013/0212127 A1 * | 8/2013 | Kitamura | 707/770 |
| 2013/0346576 A1 * | 12/2013 | Huang et al. | 709/223 |

OTHER PUBLICATIONS

Ahmad N.M. End to End Ipsec Support Across IPv4/Ipv6 Translation Gateway, Sep. 2010, IEEE, pp. 222-227.*

* cited by examiner

*Primary Examiner* — Shin-Hon Chen
*Assistant Examiner* — Viral Lakhia
(74) *Attorney, Agent, or Firm* — Trop, Pruner & Hu, P.C.

(57) ABSTRACT

In one embodiment a method for receiving a request from a user to update a pointer record of a domain name system (DNS) in a DNS service includes issuing a query from the DNS service to a resource of a first service of the data center from the DNS service using a uniform resource indicator (URI) of the request corresponding to the resource, receiving a list of Internet protocol (IP) addresses in the DNS service from the first service, determining whether an IP address received in the request corresponds to one of the IP addresses of the list, and if so, enabling the user to update the pointer record.

10 Claims, 5 Drawing Sheets

VALIDATING POINTER RECORDS IN A DOMAIN NAME SYSTEM (DNS) SERVICE

BACKGROUND

As is well known, websites available via the Internet are accessed using a domain name entered by a user. To enable a user's computing system to access the website, a conversion of the user-entered domain name to an Internet protocol (IP) address occurs. In general, this translation between domain name and IP address occurs in a manner provided for by the domain name system (DNS), which is a globally distributed system that provides for allocation of IP addresses to service providers, who in turn can provide particular addresses to their customers to use as addresses to web servers and other resources.

To enable the resolution of a domain name, which can be in the form of a fully qualified domain name (FQDN), namely a full domain name such as www.example.com, a request can be issued from a user's system to a DNS entity to request a corresponding IP address for a given domain name. DNS entities are arranged in a cascaded manner, from top level entities to lower level entities. While a single authoritative nameserver includes a forward zone record that provides this translation, various DNS caching entities may exist to cache this forward zone record in a variety of locations, to enable faster access to the information.

A current trend in information technology is the push towards cloud computing, in which businesses and other entities access various products and services remotely, e.g., via the Internet. To this end, infrastructure providers such as cloud service providers have massive data centers that provide a variety of computing resources that can be allocated to customers in a flexible manner. Some providers have certain resources that are dedicated to particular customers, and other so-called cloud resources that can be dynamically allocated to customers for limited time periods.

With the push towards cloud computing, various products and services that were historically purchased and/or licensed to particular users are now being offered in a service oriented architecture (SOA) by these cloud service providers.

One such service is a cloud DNS service, which generally provides the ability for a customer to manage a forward zone, which is a record that identifies an IP address for a domain name (specifically a FQDN) that the customer owns. In addition to forward zone records, reverse zone records also exist. A reverse zone is a record that identifies a FQDN for a given IP address. Before allowing a customer the ability to edit reverse zones, an infrastructure provider (who owns the authoritative nameserver for its IP addresses/reverse zones) typically performs some type of authentication process, such as determining which IP addresses are assigned to which customers, and which FQDNs are owned/managed by each customer. Information regarding which FQDNs are owned/managed by a customer is generally distributed in a DNS service, as domains can be used for a variety of endpoints (e.g., web site, load balancer, server, etc.). With distributed forward zone management, the DNS service is typically the central service that stores FQDNs assigned per customer.

For various infrastructure providers, IP address assignment and management is often not distributed because every product or service of the provider that uses an IP address would need to integrate with the distributed service to provide for a singular interface for customers to manage reverse zones. Instead, many cloud service providers assign IP address blocks to individual services to prevent having to create and integrate a distributed IP address management service, as creating a new service is costly.

SUMMARY OF THE INVENTION

In one aspect, the present invention includes a method for receiving a request from a user to update a pointer record of a domain name system (DNS) in a DNS service located in a data center of an infrastructure provider being an authoritative entity for the pointer record, issuing a query from the DNS service to a resource of a first service of the data center from the DNS service using a uniform resource indicator (URI) of the request corresponding to the resource, and receiving a list of Internet protocol (IP) addresses in the DNS service from the first service. This list of IP addresses may include at least one IP address associated with the resource.

Then the method can determine whether an IP address received in the request corresponds to one of the one or more IP addresses of the list of IP addresses, and if so the user is enabled to update the pointer record. If instead the IP address received in the request does not correspond to an IP address in the list, the user is prevented from updating the pointer record. In an embodiment, the request may be received via a public application programming interface (API) of the DNS service and in turn the query can be issued to a public API of the first service.

Another aspect is directed to a system including a DNS service configured on a first set of servers. This DNS service may have a DNS public API to associate a FQDN with a resource of a data center allocated to a customer, and may generate and store a forward zone to return an IP address for the resource responsive to receipt of the FQDN and to generate and store a reverse zone to return the FQDN responsive to receipt of the IP address. In turn, a cloud server service can be configured on a second set of servers coupled to the DNS service. This service may include cloud server resources each associated with at least one IP address, and a block of unallocated IP addresses and an allocator to allocate, in a decentralized manner, at least one of the IP addresses to a cloud server resource and to record the allocation in a table that associates a list of one or more IP addresses for each of the plurality of cloud server resources.

In this system, the DNS service can validate a customer request to modify a reverse zone using the list for a cloud server resource associated with the reverse zone and received from the cloud server service responsive to a query from the DNS service.

Yet another aspect of the present invention is directed to a non-transitory computer readable medium that stores instructions that enable a DNS service of a data center to perform various operations. These operations include association of a reverse zone with a customer where the reverse zone includes an IP address of a resource of a service of the data center and a FQDN of the customer. The service is the owner and allocator of the IP address to the resource, and the data center is of a service oriented architecture and not having a centralized IP management authority.

The instructions further enable the DNS service to receive a request from the customer to update the reverse zone, issue a query to the service responsive to the request, obtain a list of one or more IP addresses associated with the customer from the service, and validate whether the customer is authorized to update the reverse zone based on the request and the list.

DETAILED DESCRIPTION

Embodiments may be used to identify IP addresses assigned to a given customer of an infrastructure provider in which the provider does not have a distributed IP address management service. Using this ability, a validation of whether a requester has the authority to modify a given reverse zone (also referred to herein as a pointer (PTR) record) can occur. That is, IP address assignment can be validated in a distributed manner on-the-fly through each service that owns an IP block within an infrastructure provider environment lacking a distributed IP address assignment/management service, without having to create such IP address assignment/management service.

In this way, in a cloud service provider system where IP address blocks are provided to each cloud service/product and address assignment is decentralized to such services/products, customers can still manage PTR records through a single service, which in various embodiments may be a DNS service. As such, each service of an infrastructure provider does not need to provide for this capability, and customers can avoid management of PTR records through each separate service. Embodiments thus provide a technique to enable a service, e.g., a DNS service, to access each separate service on behalf of a customer, thereby providing a single service for the customer to manage both reverse and forward zones.

Figure 1:
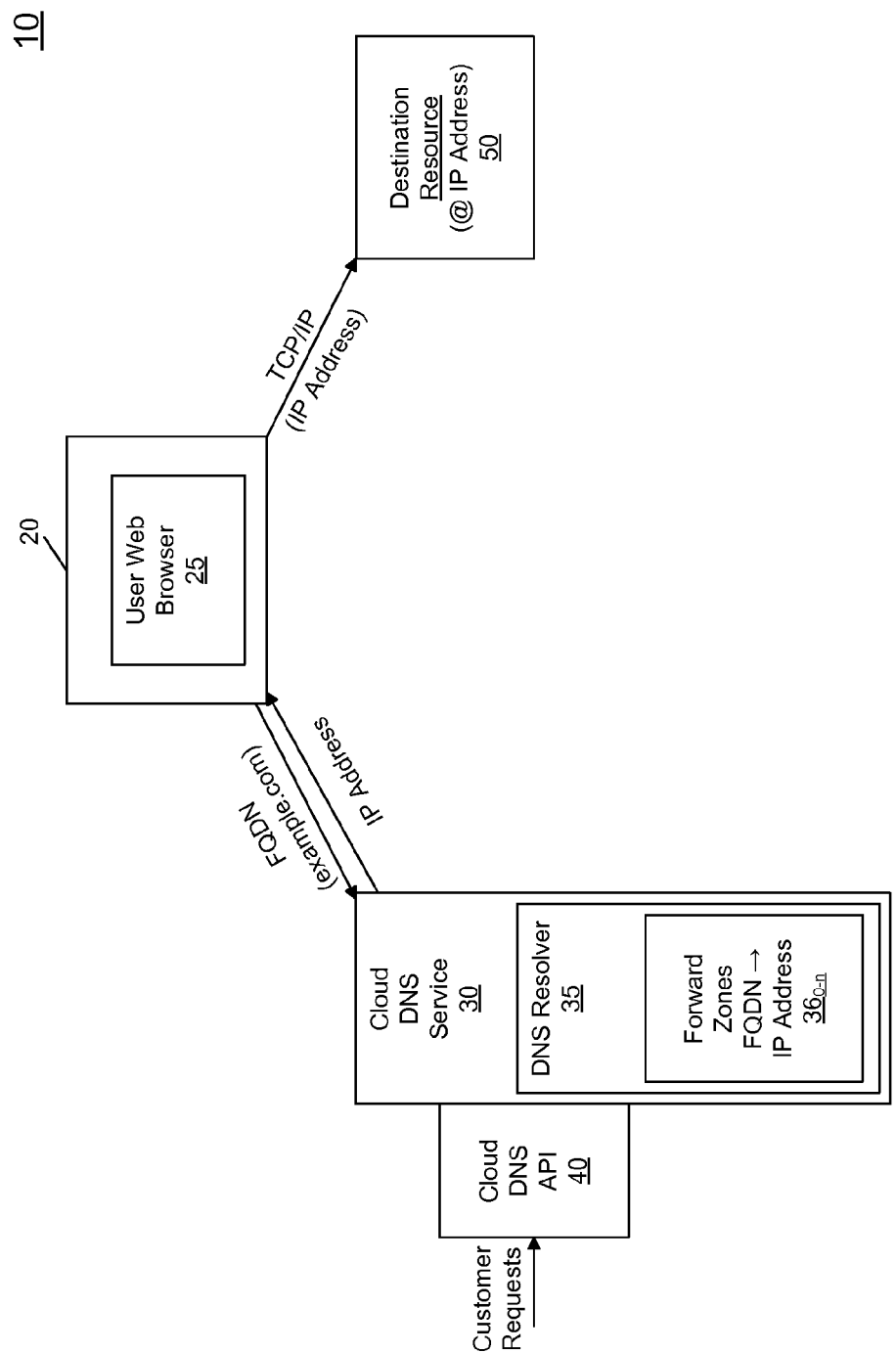
FIG. 1 is a high-level block diagram of a system for handling DNS lookups.

Referring now to FIG. 1, shown is a high-level block diagram of a system for handling DNS lookups. In FIG. 1, system 10 illustrates a computer network including computing systems that can be located in a wide variety of locations. In the example shown, a user system 20 which may be a user's personal computer, laptop computer, tablet computer, smartphone or so forth, and may be configured with a web browser 25 that can be used to browse websites available via the Internet. Before a user can communicate with a destination resource 50, which can be assumed to be a web server present at a given IP address, the web browser must first determine the appropriate IP address.

To do so, when a user enters a domain name, more specifically an FQDN, a request for an IP address is made to the DNS system. As mentioned above, this DNS system can include servers globally located and which collectively can identify an IP address for the FQDN, either via a cached copy of a forward zone that includes an association between the FQDN and the IP address, or via a cascaded search through a number of DNS servers until a cached or original authorized version of this forward zone is found.

As shown in FIG. 1, a cloud-based DNS service 30 may be present, e.g., within a data center such as a data center of a multi-tenant cloud-based service provider. To enable customers to access this cloud DNS service, a cloud DNS application programming interface (API) 40 may be configured to receive incoming customer requests and pass them along to cloud DNS service 30. This cloud DNS service may be implemented in a number of servers of the data center. Note that each such server can include one or more processors, a system memory, mass storage, and one or more peripheral devices such as a network interface. To provide IP addresses, service 30 may include a DNS resolver 35 which may be configured to provide an IP address responsive to a request for the IP address and based on an FQDN of the request.

DNS resolver 35 may store the forward zones $36_0$-$36_n$ for a number of IP addresses. That is, users can request that cloud DNS service 30 provide an IP address for a given FQDN. This IP address can correspond to any type of computing resource that a customer wants to associate with the domain name. In many examples, this resource may be a web server that can be implemented as a dedicated web server, e.g., present at a customer's location or as a dedicated web server present in the data center. Still further in some embodiments this resource can be a cloud-based resource such as a cloud server to handle web serving for the customer.

Thus using system 10, an IP address corresponding to a given FQDN can be provided to a user's system 20. For example, the resulting IP address from a forward zone can be provided to browser 25 to enable the browser to access destination resource 50, e.g., using a TCP/IP protocol using the IP address obtained. Although shown at this high level in the embodiment of FIG. 1, understand the scope of the present invention is not limited in this regard.

Figure 2:
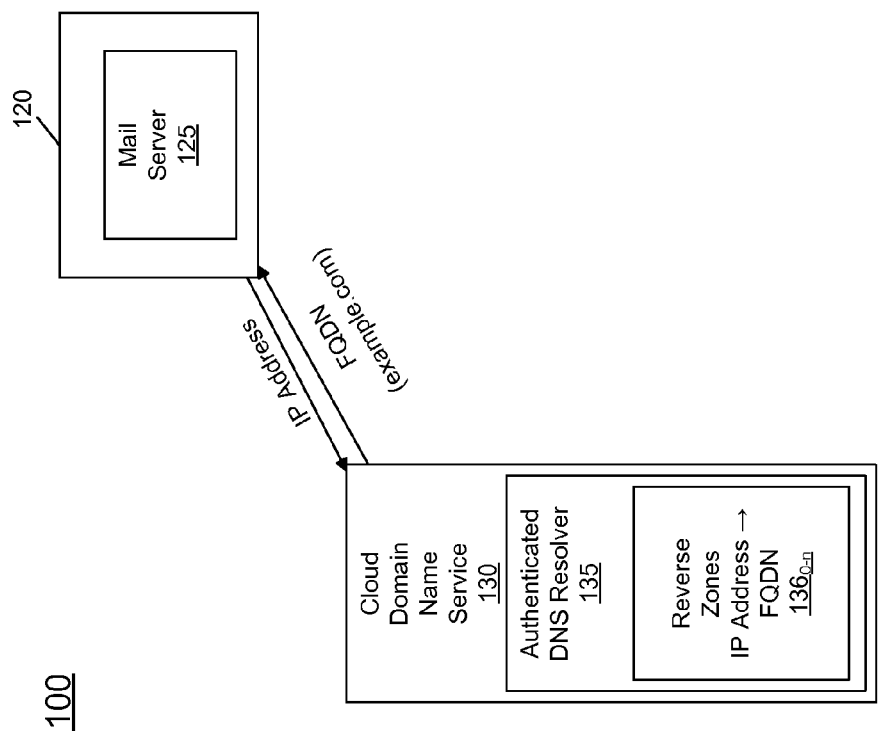
FIG. 2 is a high-level block diagram of a system for handling reverse DNS lookups.

Referring now FIG. 2, shown is an illustration of a system 100, which generally can correspond to a portion of system 10 described above. Here system 100 includes a user computing device 120 that can communicate via a network to cloud DNS service 130 (via a public API, not shown in FIG. 2), which may generally correspond to cloud DNS service 30 of FIG. 1. In this instance however, instead of seeking an IP address, system 120 may seek a FQDN for a given IP address. For example, assume that system 120 includes a mail server 125. For purposes of e-mail operations of an entity, mail server 125 may seek to determine as part of its security processing whether incoming e-mails received from a given e-mail address are truly from the indicated entity, or whether they are some type of phishing or other improper e-mail.

To this end, server 125 may communicate an IP address to cloud DNS service 130 to seek the corresponding FQDN. To respond to this request, cloud DNS service 130 may use an authenticated DNS resolver 135. Note that in this reverse case, resolver 135 may be an authenticated resolver, as the service provider is the entity that owns the IP address and associates it with the given resource. In this example instead of accessing one or more forward zones, reverse zones $136_0$-$136_n$ may be accessed. These reverse zones may provide an FQDN responsive to input of an IP address. Although shown with this particular example of a request for a reverse zone or PTR record, understand that such reverse requests to obtain an IP address can occur in many other circumstances such as for diagnostic or security (identification) purposes.

Figure 3:
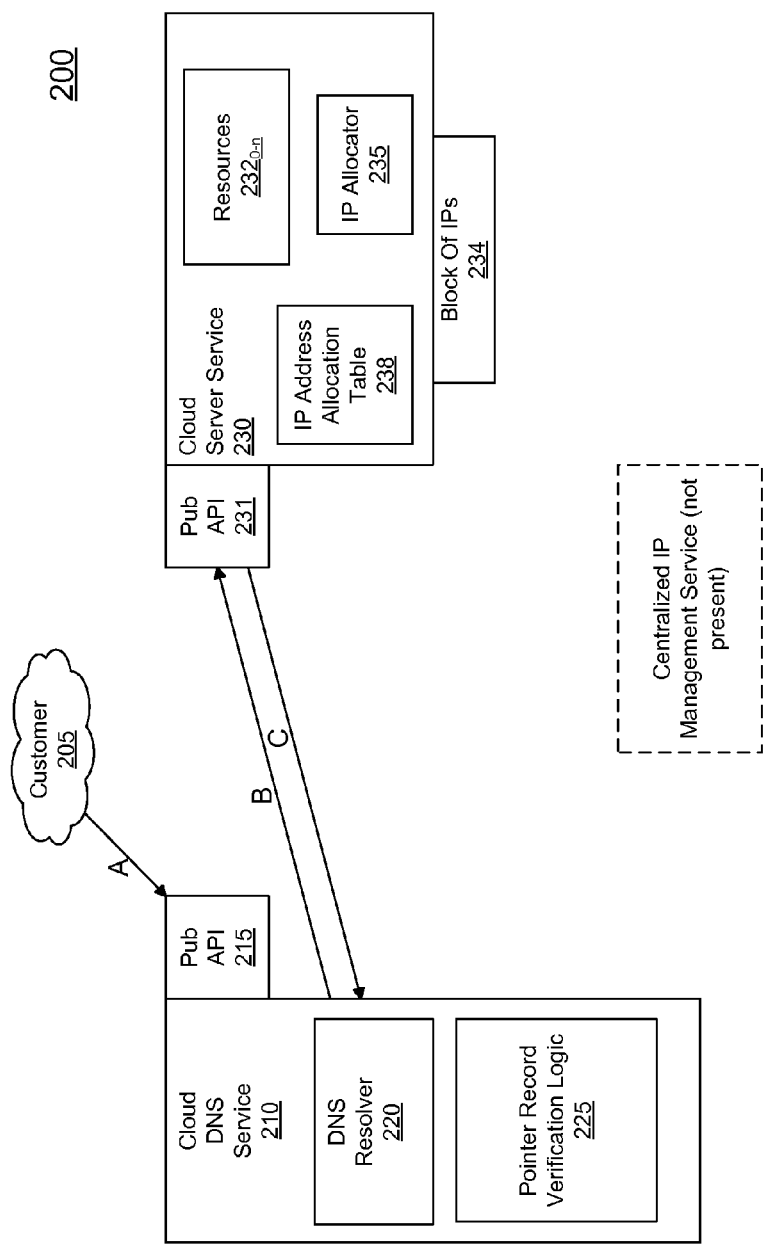
FIG. 3 is a block diagram of a data center in accordance with an embodiment of the present invention.

Referring now to FIG. 3, shown is a block diagram of a data center 200 in accordance with an embodiment of the present invention. As shown in FIG. 3, data center 200 may be of an infrastructure provider such as a cloud service provider, and can include various resources. These resources can take a number of forms including servers, storage resources, load balancer resources, and various hardware and software that can be provided as services.

For illustration purposes, several services that are provided via a service oriented architecture (SOA) are detailed. First, a cloud DNS service 210 may be present and can be generally configured as described above to enable generation of authoritative DNS records for reverse zones. This service can be implemented on a set of servers of the data center. In addition, a cloud server service 230 may be present to enable customers to efficiently and dynamically increase or reduce the amount of server resources it needs depending upon its business demands. Similarly, service 230 can be implemented on another set of servers of the data center. Although not shown for ease of illustration understand that the data center may include other services such as a cloud load balancer service which can be used to provide cloud-based access to load balancers, e.g., based on business demands of a customer. This service can be implemented, at least in part on a set of load balancers of the data center. A customer 205 can communicate with any of these services directly via a public API of the corresponding service. Via these APIs, a customer can request a resource of the service, delete a previously allocated resource of the service, perform other updates, and access the resources allocated to the customer for performing desired computing, storage and other operations. In general, for every data center resource allocated to a customer, one or more IP addresses are designated to that resource for purposes of making the resource addressable by the customer.

With reference to cloud DNS service 210, a customer can access this service via a public API 215. Cloud DNS server 210 may further include a DNS resolver 220 which can generally operate to provide IP addresses responsive to receipt of a FQDN and vice versa. Note that DNS resolver 220 may be an authenticated resolver with regard to reverse zones for domain names associated with customers of the service provider that request IP addresses for resources either within the data center or otherwise associated with the customer.

As further seen in FIG. 3, cloud DNS server 210 may further include a pointer record verification logic 225. As will be described further below, when a customer requests to perform some type of update to a reverse zone, logic 225 may verify that the customer is authorized to update this record before allowing the update to occur, since in such instances DNS resolver 220 is the authenticated resolver for such reverse zones.

With regard to cloud server service 230, customer access may be via a public API 231. As an example, cloud server service 230 may include a plurality of server resources $232_0$-$232_n$, which in different embodiments can be physical servers or may be virtual servers such as virtual machines that operate on an underlying physical server. Note that cloud server service 230 may further include an allocator 235 which may allocate IP addresses to such server resources. These IP addresses can be obtained from an IP address block 234 that is provided to cloud server service 230. This IP block can be received from another entity of the service provider, e.g., a network authority of the service provider, which maintains a larger block or pool of unallocated IP addresses. In turn, the service provider may obtain this IP address pool from a central DNS authority such as ICANN. Note in this regard that the service provider is authoritative for the IP address blocks. A service provider can delegate IP address blocks to individual services/products (decentralized), but maintain the reverse zones for all IP address blocks in a centralized location as described herein such that an embodiment can leverage this information to validate to customer requests. Alternatives would be to: (1) centralize both IP address allocation and reverse zone management; or (2) decentralize IP address allocation by service and decentralize DNS service for reserve zone management to each service. Either option would increase complexity, and the second option would also be very costly, as each product/service would need to implement its own DNS service.

This unallocated block 234 is thus provided to service 230 to enable association with particular resources allocated to a given customer by allocator 235. To record such allocations, an IP address allocation table 238 may be present, which may include a plurality of entries each including a list of IP addresses associated with a given resource and the corresponding customer.

Referring still to FIG. 3, assume a customer 205 issues a request A to cloud DNS service 210 via public API 215. This request is to modify a pointer record. To verify that the customer is allowed to perform such update, a verification of information associated with the customer can occur, including operations within cloud DNS service 210 and within cloud server service 230, assuming that the pointer record is for a resource within service 230. To this end, cloud DNS service 210 may communicate a query B to cloud server service 230 via its public API 231. As will be described further below, in various embodiments this query may be issued as a masquerade of the customer using certain customer information such that service 230 performs a verification believing that it is for the customer. The results of such verification however, are communicated back to cloud DNS service 210 as a response C, where they can be analyzed to determine whether to allow customer 205 to update the pointer record according to the request.

In this way, a cloud DNS service can validate that the customer is authorized to make the update to the reverse zone by verifying that the IP address of the reverse zone to be updated has been assigned to a resource that has in fact been allocated to the customer. More so, understand that these operations occur in a data center that does not have a centralized IP address management service (shown in phantom in FIG. 3). Although shown at this high level in FIG. 3, understand the scope of the present invention is not limited in this regard.

Figure 4:
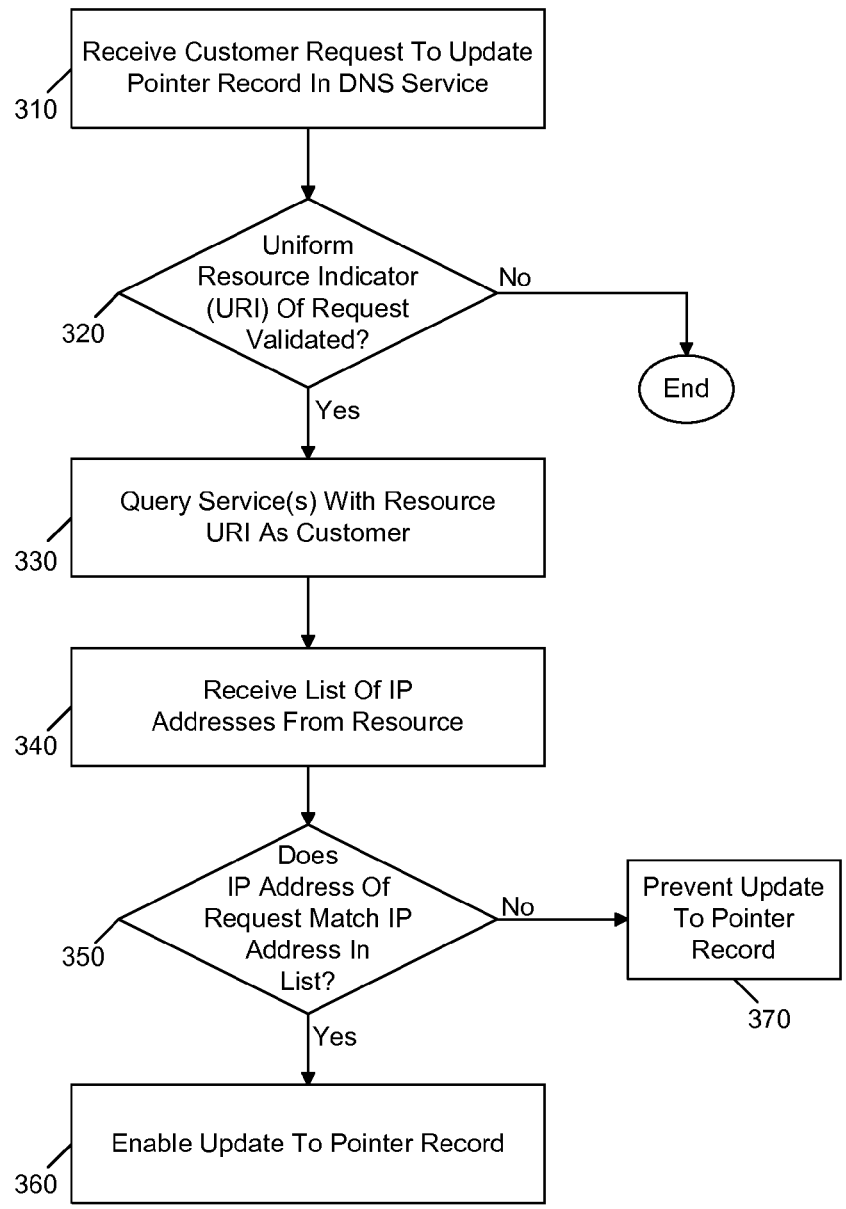
FIG. 4 is a flow diagram of a method for performing an update to a pointer record in accordance with an embodiment of the present invention.

Referring now to FIG. 4, shown is a flow diagram of a method for performing an update to a pointer record in accordance with an embodiment of the present invention. As shown in FIG. 4, method 300 may be implemented via various services of a cloud infrastructure provider and which may be executed on one or more servers or other computer resources including hardware, software, firmware, and combinations thereof. As seen in FIG. 4, method 300 may begin by receiving a customer request to update a pointer record (block 310). As discussed above, this request may be received in a DNS service, e.g., via its public API. In one embodiment, a request received from a customer may include identification information of the customer and a uniform resource indicator (URI), which is an identifier for a given resource for which the user seeks to modify a pointer record. In the context of the pointer record operations described herein, this resource can constitute any type of computing device, which may be dedicated to the customer or may be a cloud-based resource. As examples, such resources can include servers, storage products, load balancers and so forth. In this embodiment, the customer information may also include an account name/number and other identifying information.

In addition, a user authentication token may be provided by the user with the request. In one embodiment, this user authentication token may be obtained via a separate request to a different service of the data center, for example, an authentication service. More specifically, prior to making the request to modify a pointer record, the customer may access this authentication service, via a public API, to obtain the user token using an API key that is unique to the customer, which in various implementations may be a given cryptographic key. In some embodiments, this user authentication token may be valid for a limited and predetermined time period, e.g., 24 hours.

In addition, the request may include an IP address of the resource, as well as a FQDN that is associated with the customer. Next it can be determined at diamond 320 whether the URI of the request is validated. More specifically, this validation is to verify that the URI actually points to a resource that exists for the customer making the request. In other words, the validation may confirm that the IP address and resource exist and that the IP address is allocated to that resource, and that the resource is allocated to the customer by validating it shows up in a list from the service for that customer (e.g., when listing resources when masquerading as the customer on that service). If not, no further operations occur and the request to update the pointer record is denied. Different manners of validating this URI can occur. As an example, the base of the URI (i.e., the URI minus the resource identifier) could be validated against a service catalog to determine if the service of that resource is valid and exists within the service provider's data centers. In another embodiment, the URI could be validated against any known lists of valid services. As another example, if a virtual server URI is passed for validation, it can be searched and matched against a list of available virtual servers associated with the customer account. Based on all of this information associated with a request, the DNS service can determine whether the customer is who he is asserted to be and is authorized.

If the URI is validated, control passes to block 330 where a service including the resource can be queried with the resource URI. In an embodiment, the query to the resource may include various identification information of the customer, including the user authentication token, as discussed above. Note that this query can be sent from the DNS service as a masquerade of the client such that the service that receives this query believes it is responding to the customer itself. This query includes a request to cause the service to access information regarding IP addresses associated with the given resource URI. A list of these addresses can then be sent back to the DNS service. Note that this list may include various IP addresses that are each associated with the identified resource. For example, these IP addresses can include an IPv4 address, an IPv6 address, one or more floating IP addresses and so forth. Accordingly at block 340 the list of IP addresses associated with the URI can be received from the service.

Referring still to FIG. 4, next control passes to diamond 350 where it can be determined whether the IP address that is received with the customer request matches an IP address within this received list. If so, the customer is thus authenticated and accordingly, control passes to block 360 where an update to the pointer record is enabled. Note that responsive to an IP match, the DNS service may send a communication to the customer to indicate that the customer has been appropriately authenticated and to thus request the information to perform the desired modification of the pointer record. If this IP address of the request does not match any of the IP addresses within the received list, control instead passes to block 370 where the update to the pointer record can be prevented. The operations described above with regard to FIG. 4 thus occur in an atomic manner such that a single request to a single service having the requested resource occurs. Although shown with this particular illustration in the embodiment of FIG. 4, persons of skill in the art understand the scope of the present invention is not limited in this regard.

For example, it is possible that instead of masquerading as the customer, the DNS service can obtain the requested information from the appropriate service in another manner. For example, a management account can be used to request this information rather than the access described above, which is via the customer's account. In such implementations, rather than accessing the appropriate service via the public API, instead a private API such as a private management API may be used.

Note also that the above discussion assumes that the customer provides a resource URI with the request to modify the pointer record. In other situations, it is possible to receive a request without this resource URI. In such cases, the above-described operations to validate the customer, the resource and the IP address prior to enabling a modification operation can vary. Specifically, instead of a single query from the DNS service to a particular service and resource within that service in an atomic matter, a batch-type query operation can occur to collect all IP addresses associated with the customer to determine whether the request is from an authorized user and to an authorized resource having a IP address matching that of the request. After receipt of responses to these multiple queries, an aggregation of the IP addresses can occur and then the matching operation can be performed. Furthermore, in this batch process it is possible to query multiple or all services of the data center for which the customer has resources.

Figure 5:
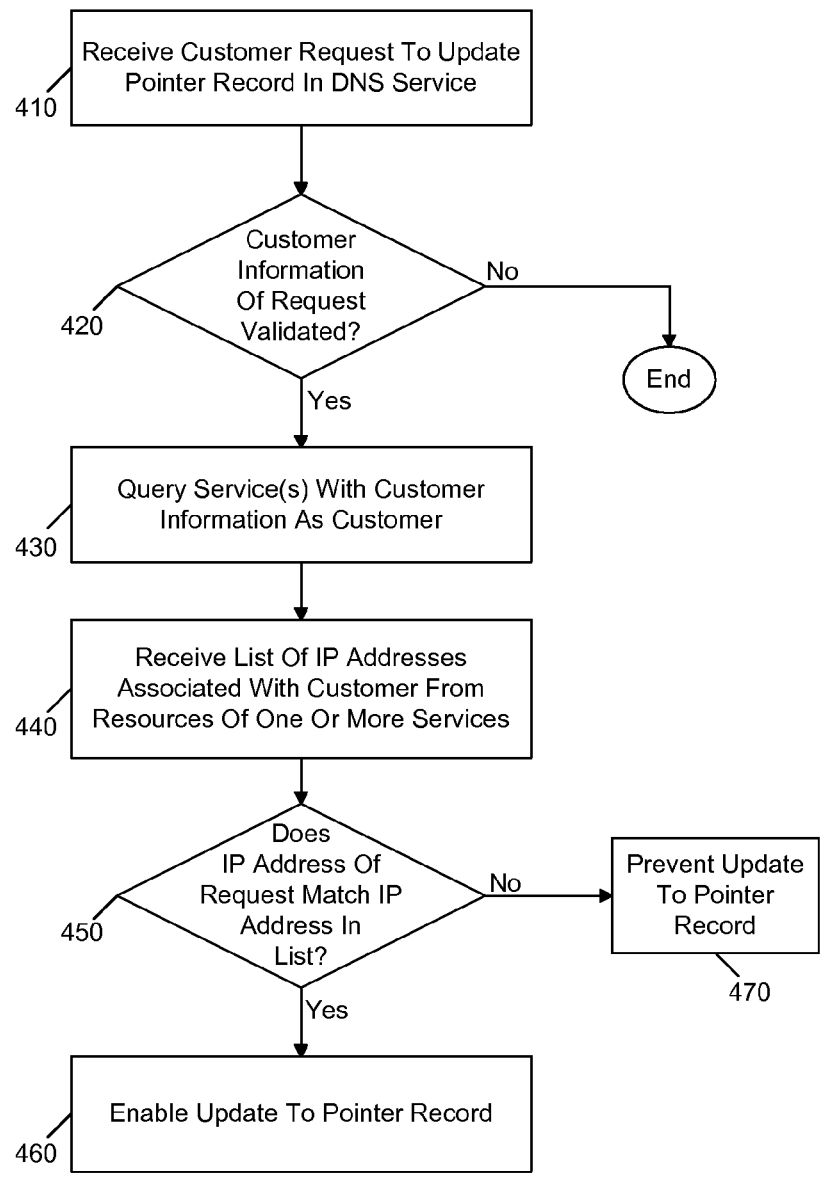
FIG. 5 is a flow diagram of another method for performing reverse zone query authorizations in accordance with another embodiment of the present invention.

Referring now to FIG. 5, shown is a flow diagram of another method for performing reverse zone query authorizations in accordance with another embodiment of the present invention. As shown in FIG. 5, method 400 may proceed similarly to that discussed above as to FIG. 4. However, here the request from the customer (received at block 410) does not include a URI of a resource associated with the customer. Instead, the request simply includes various information of the customer and the IP address associated with the pointer record to be changed. Thus here at diamond 420 it is determined whether the customer information of the request is validated. This customer information can take different forms and may include a key-based validation as discussed above. Assuming that the validation is successful, control passes to block 430 where one or more services associated with the customer information can be queried. As above, this query can be implemented via a masquerade as the customer. Instead of querying just a single resource of a single service, it is to be understood that this query may be to multiple services of a SOA arrangement. Responsive to this query a list of IP addresses associated with the customer can be received from the resources of one or more services (block 440). Then a determination can be made at diamond 450 whether the IP address of the request matches an IP address in the list. If so, an update to the pointer record can be enabled (block 460). Otherwise, such update is prevented (block 470).

Embodiments may be implemented in code and may be stored on a non-transitory storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system comprising:
 a domain name system (DNS) service configured on a first set of servers of a data center, the DNS service having a DNS public application programming interface (API) to associate a fully qualified domain name (FQDN) with a resource of the data center allocated to a customer, the DNS service to generate and store a forward zone to return an Internet protocol (IP) address for the resource responsive to receipt of the FQDN and to generate and store a reverse zone to return the FQDN responsive to receipt of the IP address; and a cloud server service configured on a second set of servers of the data center coupled to the DNS service, the cloud server service including a plurality of cloud server resources each associated with at least one IP address, the cloud server service having a block of unallocated IP addresses and an allocator to allocate, in a decentralized manner, at least one of the IP addresses to a cloud server resource and to record the allocation in a table that associates a list of one or more IP addresses for each of the plurality of cloud server resources, the cloud server service to receive the block of unallocated IP addresses from a network authority of the data center that receives the block of unallocated IP addresses from a central DNS authority, wherein the DNS service is to validate a customer request to modify a reverse zone using the list of the one or more IP addresses for a cloud server resource associated with the reverse zone and received from the cloud server service responsive to a query from the DNS service, the DNS service to receive an authentication token with the customer request, and issue the authentication token with the query to enable the query to masquerade as originating from the customer, the authentication token issued to the customer from an authentication service of the data center responsive to a private key of the customer.

2. The system of claim 1, wherein the DNS service includes verification logic to validate the customer request.

3. The system of claim 1, wherein the DNS service is to issue the query to a first cloud server resource using a uniform resource indicator (URI) of the customer request corresponding to the first cloud server resource, and receive a list of IP addresses from the first cloud server resource.

4. The system of claim 1, wherein the cloud server service is to receive the block of unallocated IP addresses from a network authority of the data center that receives the block of unallocated IP addresses from a central DNS authority.

5. A system comprising:
a network authority of a data center to maintain a pool of unallocated Internet protocol (IP) addresses obtained from a central domain name service (DNS) authority and to delegate blocks of the unallocated IP addresses to a plurality of cloud services of the data center;
a domain name system (DNS) service configured on a first set of servers of the data center, the DNS service having a DNS public application programming interface (API) and to associate a fully qualified domain name (FQDN) with a resource of the data center allocated to a customer, the DNS service to centralize management of pointer records for the plurality of cloud services of the data center in which IP address allocation is decentralized;
a cloud server service configured on a second set of servers of the data center coupled to the DNS service, the cloud server service including a plurality of cloud server resources each associated with at least one IP address, the cloud server service having a block of unallocated IP addresses received from the network authority and an allocator to allocate, in a decentralized manner, at least one of the IP addresses to a cloud server resource and to record the allocation in a table that associates a list of one or more IP addresses for each of the plurality of cloud server resources, wherein the DNS service is to validate a customer request to modify a reverse zone using the list of the one or more IP addresses for a cloud server resource associated with the reverse zone and received from the cloud server service responsive to a query from the DNS service, wherein the DNS service is to receive an authentication token with the customer request and issue the authentication token with the query to enable the query to masquerade as originating from the customer, the authentication token issued to the customer from an authentication service of the data center responsive to a private key of the customer.

6. The system of claim 5, wherein the DNS service includes verification logic to validate the customer request.

7. The system of claim 5, wherein the DNS service is to issue the query to a first cloud server resource using a uniform resource indicator (URI) of the customer request corresponding to the first cloud server resource, and receive a list of IP addresses from the first cloud server resource.

8. A system comprising:
a network authority of a data center to maintain a pool of unallocated Internet protocol (IP) addresses obtained from a central domain name service (DNS) authority and to delegate blocks of the unallocated IP addresses to a plurality of cloud services of the data center;
a domain name system (DNS) service configured on a first set of servers of the data center, the DNS service having a DNS public application programming interface (API) to associate a fully qualified domain name (FQDN) with a resource of the data center allocated to a customer, the DNS service to generate and store a forward zone to return an Internet protocol (IP) address for the resource responsive to receipt of the FQDN and to generate and store a reverse zone to return the FQDN responsive to receipt of the IP address, the DNS service to centralize management of reverse zones for the plurality of cloud services, wherein the DNS service is not configured to centralize management of forward zones; and
a cloud server service configured on a second set of servers of the data center coupled to the DNS service, the cloud server service including a plurality of cloud server resources each associated with at least one IP address, the cloud server service having a block of unallocated IP addresses received from the network authority and an allocator to allocate, in a decentralized manner, at least one of the IP addresses to a cloud server resource, wherein the DNS service is to validate a customer request to modify a reverse zone using a list of a plurality of IP addresses for a cloud server resource associated with the reverse zone, the list received from the cloud server service responsive to a query from the DNS service in which the DNS service masquerades as the customer using an authentication token received with the customer request and issued to the customer from an authentication service of the data center responsive to a private key of the customer.

9. The system of claim 8, wherein the DNS service includes verification logic to validate the customer request.

10. The system of claim 8, wherein the DNS service is to issue the query to a first cloud server resource using a uniform resource indicator (URI) of the customer request corresponding to the first cloud server resource, and receive a list of IP addresses from the first cloud server resource.

* * * * *